United States Patent
Kanou (10) Patent No.: US 10,135,710 B2
(45) Date of Patent: Nov. 20, 2018

(54) INFORMATION PROCESSING APPARATUS

(71) Applicant: TOSHIBA MEMORY CORPORATION, Tokyo (JP)

(72) Inventor: Takashi Kanou, Yokohama Kanagawa (JP)

(73) Assignee: Toshiba Memory Corporation, Tokyo (JP)

(*) Notice: Subject to any disclaimer, the term of this patent is extended or adjusted under 35 U.S.C. 154(b) by 93 days.

(21) Appl. No.: 15/250,845

(22) Filed: Aug. 29, 2016

(65) Prior Publication Data

US 2017/0264519 A1    Sep. 14, 2017

(30) Foreign Application Priority Data

Mar. 9, 2016   (JP) .................... 2016-045510

(51) Int. Cl.
*H04L 12/28* (2006.01)
*H04L 12/26* (2006.01)
(Continued)

(52) U.S. Cl.
CPC ........ *H04L 43/0882* (2013.01); *H04L 5/0055* (2013.01); *H04L 47/30* (2013.01); *H04L 47/34* (2013.01)

(58) Field of Classification Search
CPC combination set(s) only.
See application file for complete search history.

(56) References Cited

U.S. PATENT DOCUMENTS

| 7,191,255 B2* | 3/2007 | Wong ................ G06F 13/423 710/15 |
| 2010/0166010 A1 | 7/2010 | Ukita et al. |
| 2013/0262892 A1* | 10/2013 | Radulescu ............ H04L 7/042 713/320 |

FOREIGN PATENT DOCUMENTS

| JP | 2005-244269 | 9/2005 |
| JP | 2014222466 A | 11/2014 |
| WO | 2009/001552 | 12/2008 |

OTHER PUBLICATIONS

Galataki, Design & Verification of UniPro Protocols for Mobile Phones, Thesis, Vrije University, Amsterdam/The Netherlands, 91 pages, Jul. 2009.*

(Continued)

*Primary Examiner* — Frank Duong
(74) *Attorney, Agent, or Firm* — Patterson & Sheridan, LLP (57) ABSTRACT

An information processing apparatus includes a transmission module to transmit data quantity information and data frame sequences at a first transmission rate and a reception module to receive the information and data frames and to transmit a reception buffer free capacity value. The transmission module includes a unit to set the data quantity information according to the reception buffer free capacity value and a transmission unit to transmit a sequence of data frames after the data quantity information for the sequence has been transmitted. The reception module includes a buffer to store the data frame sequences from the transmission module and a unit to calculate an expected free capacity for the buffer with the transmitted data frames stored therein. The expected free capacity is calculated using the data quantity information and is transmitted as the reception buffer free capacity value at a second transmission rate.

18 Claims, 8 Drawing Sheets

(51) Int. Cl.
*H04L 5/00* (2006.01)
*H04L 12/835* (2013.01)
*H04L 12/801* (2013.01)

(56) References Cited

OTHER PUBLICATIONS

UniPro(SM) Specifications, MIPI Alliance Launches M-PHY v3.0 + UniPro v1.6 Specifications, MIPI Alliance, Inc., Copyright 2016, pp. 1-6.

* cited by examiner

|  | MODE | TRANSMISSION RATE |
|---|---|---|
| HIGH RATE TRANSMISSION (HIGH CONSUMPTION POWER) | MODE 1(DP) | 1.0Gbps or 1.5Gbps |
|  | MODE 2(DP) | 2.5Gbps or 3.0Gbps |
|  | MODE 3(DP) | 5.0Gbps or 6.0Gbps |
| LOW RATE TRANSMISSION (LOW CONSUMPTION POWER) | MODE 1(UP) | 3Mbps~10Mbps |
|  | MODE 2(UP) | 6Mbps~20Mbps |
|  | MODE 3(UP) | 14Mbps~40Mbps |
|  | MODE 4(UP) | 25Mbps~80Mbps |

INFORMATION PROCESSING APPARATUS

CROSS-REFERENCE TO RELATED APPLICATION

This application is based upon and claims the benefit of priority from Japanese Patent Application No. 2016-045510, filed Mar. 9, 2016, the entire contents of which are incorporated herein by reference.

FIELD

Embodiments described herein relate generally to an information processing apparatus.

BACKGROUND

In the related art, an affirmative response (hereinafter, refer to "ACK" (Acknowledgement)) frame, which indicates that data has been normally received, is transmitted to a transmission source before the next data is transmitted between modules of an information processing apparatus.

DETAILED DESCRIPTION

According to an embodiment, an information processing apparatus or system, comprises a transmission module configured to transmit data quantity information and a first sequence of data frames at a first transmission rate, and a reception module configured to receive the data quantity information and the first sequence of data frames from the transmission module and to transmit a reception buffer free capacity value. The transmission module includes a data quantity transmission unit configured to set the data quantity information for the first sequence of data frames according to the reception buffer free capacity value, and a data transmission unit configured to transmit the first sequence of data frames at the first transmission rate after the data quantity information for the first sequence of data frames has been transmitted. The reception module includes a reception buffer, configured to store the first sequence of data frames transmitted from the transmission module, and a free capacity transmission unit, configured to calculate an expected free capacity of the reception buffer corresponding to a free capacity of the reception buffer after the first sequence of data frames has been stored therein. The expected free capacity is calculated based on the data quantity information. The free capacity transmission unit transmits the expected free capacity as the reception buffer free capacity value at a second transmission rate that is lower than the first transmission rate.

Hereinafter, an example embodiment will be described with reference to drawings.

1. Configuration

Figure 1:
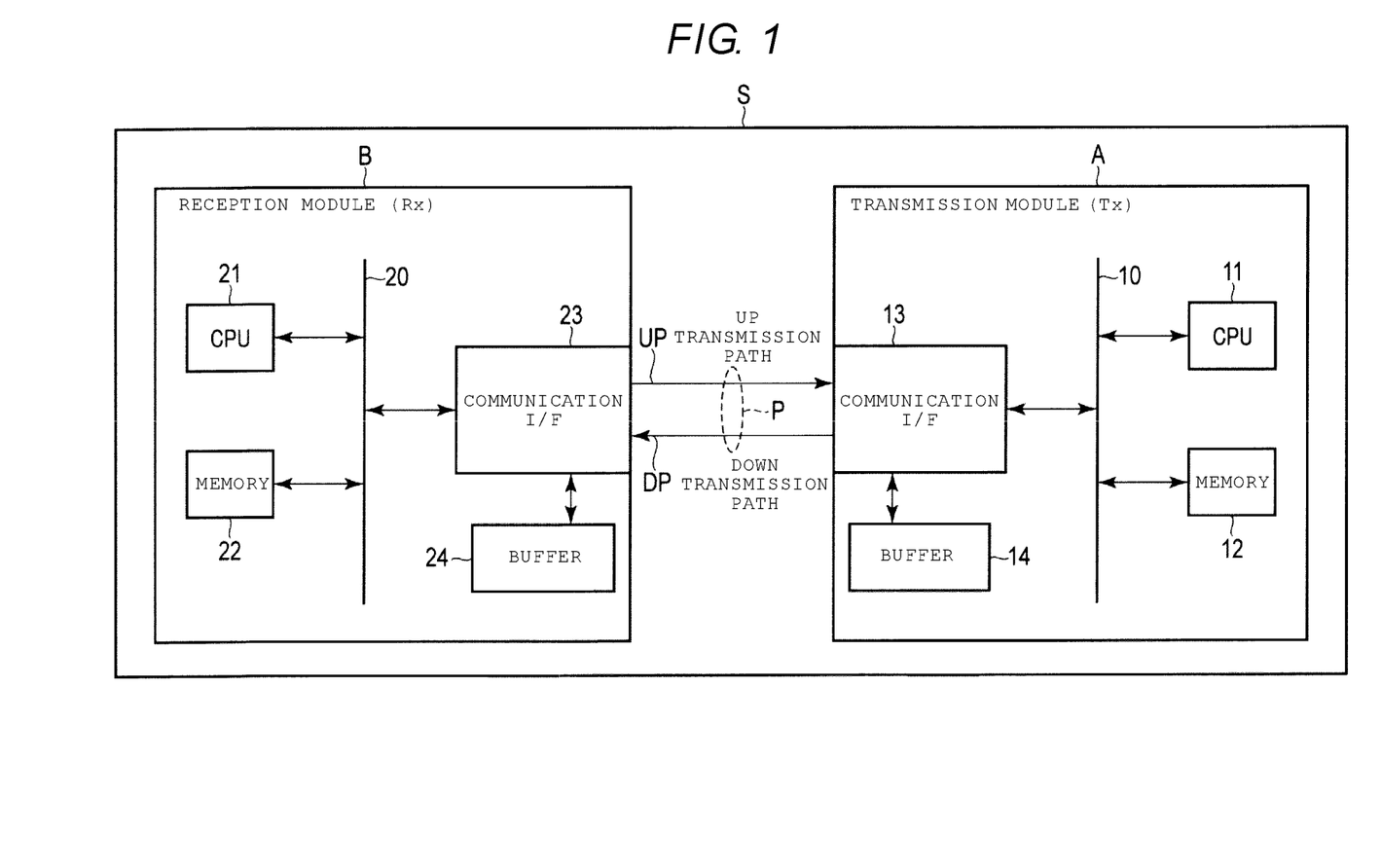
FIG. 1 is a diagram illustrating an information processing apparatus which includes a transmission module and a reception module according to an embodiment.

FIG. 1 is a diagram illustrating an information processing apparatus S including a transmission module A and a reception module B according to an embodiment.

The transmission module A includes a CPU 11, a memory 12, a communication I/F 13, and a buffer 14. Transmission module A may be referred to as a transmitter in some instances.

The CPU 11, the memory 12, and the communication I/F 13 are connected to a bus 10. The buffer 14 is connected to a layer of a communication interface 13. For example, in a Specification for Unified Protocol (for example, version 1.6 or the like), also referred to as "UniPro Specification" as established by the MIPI Alliance (Piscataway, N.J.), the buffer 14 would be connected to a data link layer (L2) of the communication interface 13.

The CPU 11 causes a program stored in the memory 12 to execute and control communication between the transmission module A and the reception module B according to the embodiment. The CPU 11 controls the entirety of the transmission module A. In addition, the CPU 11 stores transmission data (for example, video data) in a transmission buffer of the buffer 14 of the communication I/F 13.

The memory 12 stores a program for controlling communication according to the embodiment, and can also be used as a work area of the CPU 11, or the like.

The communication I/F 13 is an interface which is used for communication with the reception module B. The communication I/F 13 is, for example, an interface based on the UniPro Specification or the like. In the example, the communication I/F 13 may be achieved by hardware, software, or a combination of hardware and software.

In addition, the communication I/F 13 is connected to a transmission path P of the reception module B. The transmission path P includes a downlink transmission path DP of a high rate and an uplink transmission path UP of a low rate. The communication I/F 13 of the transmission module A transmits a data frame to the reception module B using the downlink transmission path DP, and receives the data frame from the reception module B using the uplink transmission path UP.

The buffer 14 is connected to the communication I/F 13. The communication I/F 13 can be classified as a plurality of layers from a viewpoint of communication, and the buffer 14 is connected to a predetermined layer of the communication I/F 13. The buffer 14 includes a transmission buffer and a reception buffer of the transmission module A.

Data being transmitted, which is stored in the transmission buffer of the buffer 14, is transmitted to the downlink transmission path DP through the communication I/F 13. Data from the reception module B, which is stored in the reception buffer of the buffer 14, is processed by the communication I/F 13 or the CPU 11.

Moreover, when the transmission rate of the downlink transmission path DP is set to such a high rate the transmission buffer may not be needed in all cases.

The reception module B includes a CPU 21, a memory 22, a communication I/F 23, and a buffer 24. The reception module B may be referred to as a receiver in some instances.

The CPU 21 causes a program stored in the memory 22 to execute and control communication between the transmission module A and the reception module B according to the embodiment. The CPU 21 controls the entirety of the reception module B.

The memory 22 stores a program for controlling communication according to the embodiment, and can be used as a work area, or the like.

The communication I/F 23 is an interface which is used for communicating with the transmission module A. The communication I/F 23 is, for example, an interface based on the UniPro Specification or the like. In the embodiment, the communication I/F 23 may be achieved by hardware, software, or a combination of hardware and software.

In addition, the communication I/F 23 is connected to the transmission path P for communicating with the transmission module A. The transmission path P includes the uplink transmission path UP of a low rate and the downlink transmission path DP of a high rate. The communication I/F 23 of the reception module B transmits the data frame to the transmission module A using the uplink transmission path UP, and receives the data frame from the transmission module A using the downlink transmission path DP.

The buffer 24 is connected to the communication I/F 23. The communication I/F 23 can be classified as a plurality of layers from a viewpoint of communication, and the buffer 24 is connected to a predetermined layer of the communication I/F 23. The buffer 24 includes a transmission buffer and a reception buffer of the reception module B.

Data stored in the transmission buffer of the buffer 24 is transmitted through the uplink transmission path UP through the communication I/F 13. Data from the transmission module A, which is stored in the reception buffer of the buffer 24 is processed by the communication I/F 23 or the CPU 21.

1-1. Functional Block Diagram

Figure 2:
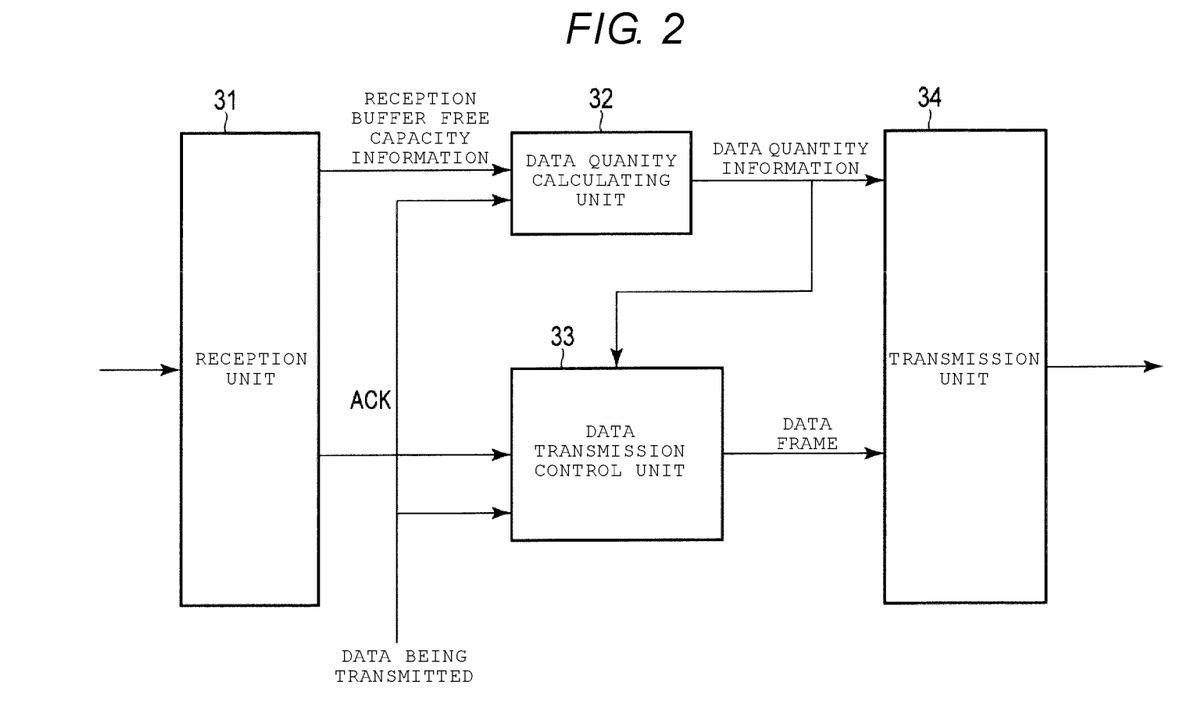
FIG. 2 is a block diagram of a transmission module according to an embodiment.

FIG. 2 is a block diagram for describing a function of the transmission module A of the embodiment.

The transmission module A according to the embodiment is provided with the following hardware units: a reception unit 31, a data quantity calculating unit 32, a data transmission control unit 33, and a transmission unit 34.

The reception unit 31 receives an ACK frame that includes reception buffer free capacity information indicating the free capacity of the buffer 24 of the reception module B. The ACK frame is transmitted by the reception module B through the uplink transmission path UP to the transmission module A.

The data quantity calculating unit 32 calculates data quantity information based on the reception buffer free capacity information provided in the ACK frame. The data quantity information for the data being transmitted includes the number of data frames which are to be transmitted in continuous sequence, and the size (or sizes) of the data frames which are being transmitted.

Here, the number of the data frames is the total number of the data frames which are transmitted in continuous (back-to-back) sequence. For example, the number of the data frames can indicate that the data being transmitted will be transmitted in a continuous sequence of frames from a frame sequence number 1 to a frame sequence number 5—that is, five total data frames will be transmitted in a continuous manner.

In the embodiment, the number of the data frames and the sizes of the data frames are determined so as to be storable inside the free capacity of the buffer 24 of the reception module B, which is indicated by the reception buffer free capacity information received from the reception module B.

In addition, the number of the data frames and the sizes of the data frames may be determined so that a transmission efficiency becomes the best. In this case, for example, when the free capacity of the buffer 24 included in the ACK frame is 512 bytes, the transmission module A determines the number of data frames and the sizes of the data frames which do not exceed 512 bytes. If the number of a payload is set as, for example, 144 symbols (=288 bytes) by a protocol standard, and sizes of the other portions of the data frame are similarly fixed, a size of one data frame can be determined (for example, 294 bytes).

However, when a free capacity of the buffer 24 in the reception module B is 512 bytes, two data frames of 294 bytes (which is a maximum protocol size in this example) cannot be received. Accordingly, in order to perform the most efficient data transmission, the sizes of the data frames are determined so that two frames can be stored in the reception buffer free capacity of the buffer 24. Specifically, it may be considered most efficient that the number of the data frames be two and the size of the data frame be 256 bytes (the number of payload is 250 bytes).

Moreover, the number of the data frames can be increased by reducing a size of one data frame, but if the number of the data frames is increased, a frequency of transmitting data (six bytes) other than the payload will be increased, and thus transmission efficiency is deteriorated.

Regarding the data quantity information from the data quantity calculating unit 32, a transmission rate of the downlink transmission path DP may be considered. As the transmission rate is increased, the more data frames that can be transmitted. A setting method for the transmission rate will be described later.

The data transmission control unit 33 sets data being transmitted to a data frame of the calculated size, and continuously outputs the calculated number of data frames based on the data quantity information. In addition, the data frame includes frame sequence numbers (sequence index numbers) for the data being transmitted.

In the embodiment, the transmission module A performs continuous transmission of the data frames immediately after the data quantity information is transmitted; however, it is not limited thereto. The data frames of the data transmission control unit 33 may be continuously output after the data quantity information has been transmitted.

The transmission unit 34 transmits the data quantity notifying frame including the data quantity information calculated by the data quantity calculating unit 32, and the data frame output from the data transmission control unit 33 to the reception module B through the downlink transmission path DP.

Figure 3:
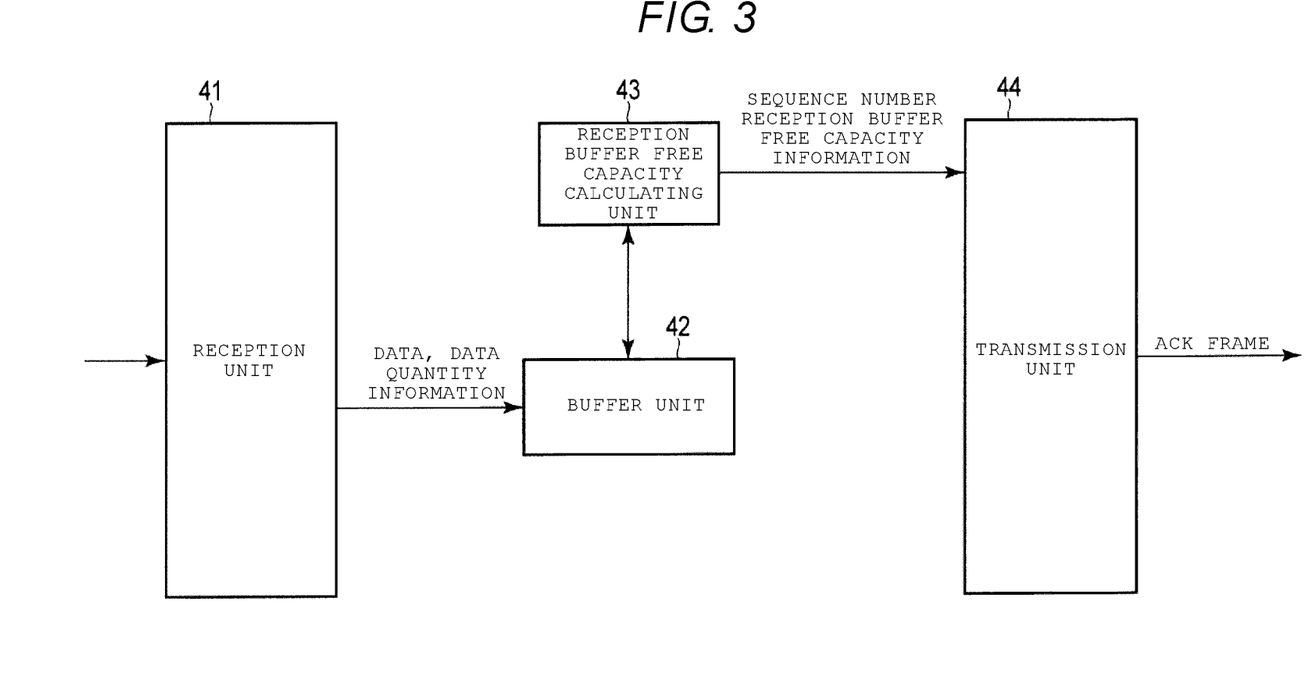
FIG. 3 is a functional block diagram of a reception module according to an embodiment.

FIG. 3 is a functional block diagram for describing a function of the reception module B of the embodiment.

The reception module B according to the embodiment includes the following hardware elements: a reception unit (receiver) 41, a buffer unit 42, a reception buffer free capacity calculating unit 43, and a transmission unit (transmitter) 44.

The reception unit 41 receives the data quantity notifying frame including the data quantity information (number of data frames and sizes of data frames) transmitted through the downlink transmission path DP from the transmission module A, the data frame which is continuously transmitted, and the like.

The buffer unit 42 stores the data quantity information received by the reception unit 41, the data being continuously transmitted, and the like.

The reception buffer free capacity calculating unit 43 calculates a free capacity of the reception buffer in the buffer 24 when the data transmission from the transmission module A is finished, based on the data quantity information stored in the buffer unit 42. That is, the reception buffer free capacity calculating unit 43 calculates the size of the vacant, unused, or otherwise available portion of the reception buffer that will remain after data having the size and structure corresponding to the previously transmitted data quantity information has been stored in the reception buffer. Also, the reception buffer free capacity calculating unit outputs (to transmission unit 44, for example) the reception buffer free capacity information indicating this calculated free capacity of the reception buffer in the buffer 24.

In addition, the reception buffer free capacity calculating unit 43 outputs the number (frame sequence number) of the last data frame which has been (or will be) transmitted from the transmission module A on the basis of a previously sent ACK frame.

The transmission unit 44 transmits the next ACK frame including the reception buffer free capacity information and the frame sequence number (which are output from the reception buffer free capacity calculating unit 43) to the module A through the uplink transmission path UP.

Moreover, the reception module B does not transmit a NAC frame (negative acknowledgement), even if errors in the reception of the data transmitted from the transmission module A have been detected. The NAC frame can be transmitted instead of the ACK frame, more generally, when the receiving of the data is not normal.

1-2. Regarding Transmission Rate

In the embodiment, a transmission rate of the uplink transmission path UP is lower (slower) than a transmission rate of the downlink transmission path DP. The embodiment is not limited to a particular determination method of transmission rate. As the determination method of transmission rate, various methods are conceivable.

For example, the transmission rate of the uplink transmission path UP and the downlink transmission path DP may be determined as a predetermined transmission rate set in advance. A plurality of modes for regulating each transmission rate can be provided in the uplink transmission path UP and the downlink transmission path DP, and the modes of the uplink transmission path UP and the downlink transmission path DP may be respectively selected from the available modes.

Figure 4:
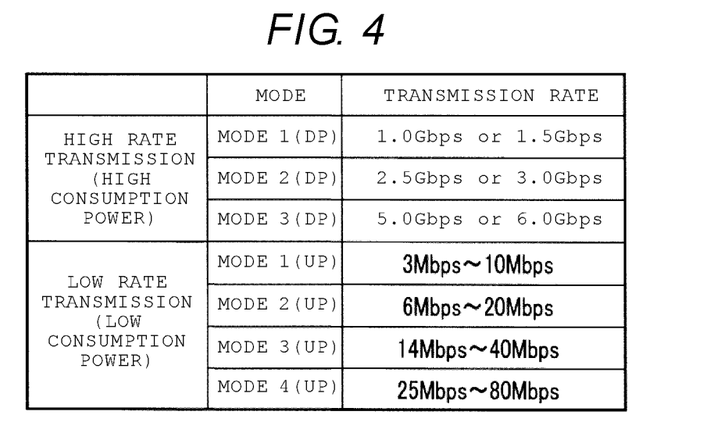
FIG. 4 is a diagram illustrating relationships between modes and transmission rates of a downlink transmission path (high rate transmission) and an uplink transmission path (low rate transmission).

FIG. 4 is a diagram illustrating relationships between the modes and the transmission rates of the downlink transmission path DP (high rate transmission) and the uplink transmission path UP (low rate transmission). In this drawing, mode 1 to mode 3 are provided in the downlink transmission path DP (high rate transmission). A transmission rate 1.0 Gbps or 1.5 Gbps is allocated to the mode 1, a transmission rate of 2.5 Gbps or 3.0 Gbps is allocated to the mode 2, and a transmission rate 5.0 Gbps or 6.0 Gbps is allocated to the mode 3. Mode 1 to mode 4 are provided in the uplink transmission path UP (low rate transmission). Transmission rates of 3 Mbps to 10 Mbps are allocated to the mode 1, transmission rates of 6 Mbps to 20 Mbps are allocated to the mode 2, transmission rates of 14 Mbps to 40 Mbps are allocated to the mode 3, and the transmission rates of 25 Mbps to 80 Mbps are allocated to the mode 4.

In addition, the transmission rates of the uplink transmission path UP and the downlink transmission path DP may be determined based on types of data being transmitted, sizes of data being transmitted, a free capacity of the buffer 14, a manual setting by a user, and the like. Also, the transmission rates may be determined each time data is transmitted.

Furthermore, the setting of the transmission rate of the downlink transmission path DP may be performed in the transmission module A, the setting of the transmission rate of the uplink transmission path UP may be performed in the reception module B, or a CPU, which controls the entirety of the information processing apparatus S, may set the transmission rates.

In addition, it is preferable that the transmission rates be set so as to narrow an interval between a finish time (T1 of FIG. 8) of the data frame sequence (e.g., frame numbers 1 to 5) transmission from transmission module A and a finish time (T1' of FIG. 8) of the ACK frame transmission from the reception module B. Accordingly, inoperative (dead) time (T1-T2, T3-T4, and T5-T6 in FIG. 8) in the downlink transmission path DP can be shortened.

1-3. Frame Configuration

Figure 5:
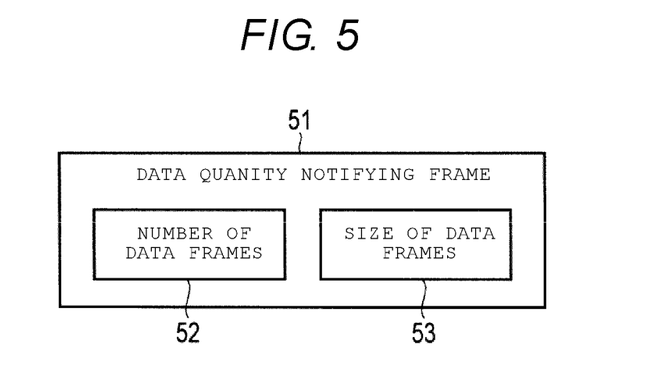
FIG. 5 is a diagram illustrating a configuration of a data quantity notifying frame to be transmitted from the transmission module.

FIG. 5 is a diagram illustrating a configuration of a data quantity notifying frame 51 transmitted from the transmission module A.

Each data quantity notifying frame 51 includes the number of data frames 52 to be continuously transmitted and a size of data frame 53 being transmitted. The number of data frame 52 corresponds to the total number of the data frames to be included in a continuous sequence (data stream) and has been calculated by the data quantity calculating unit 32 of the transmission module A beforehand. The size of data frame 53 provides a size of each data frame included in the continuous transmission sequence.

Figure 6:
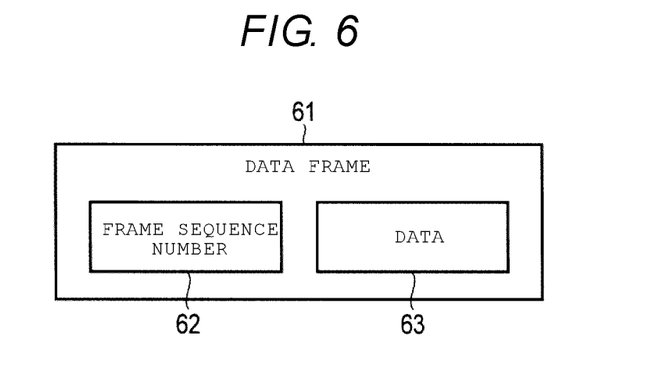
FIG. 6 is a diagram illustrating a configuration of a data frame to be transmitted from the transmission module.

FIG. 6 is a diagram illustrating a configuration of a data frame 61 being transmitted from the transmission module A.

Each data frame 61 includes a frame sequence number 62 and data 63. The frame sequence number 62 is the sequence number of the particular data frame being transmitted in the continuous transmission sequence. Each data 63 is the particular data (data packet) for the respective data frame 61 being transmitted.

Figure 7:
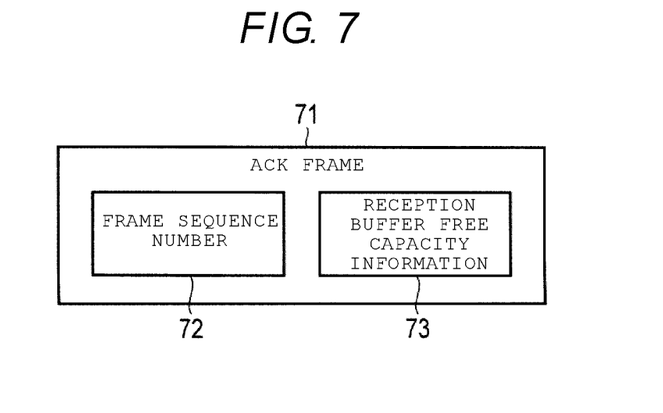
FIG. 7 is a diagram illustrating a configuration of an ACK frame to be transmitted from the reception module.

FIG. 7 is a diagram illustrating a configuration of a ACK frame 71 transmitted from the reception module B.

Each ACK frame 71 includes a frame sequence number 72 and reception buffer free capacity information 73. The frame sequence number 72 is the frame sequence number 62 corresponding to the last expected data frame 61 according to the number of data frames 52 included in a data quantity notifying frame 51 that has been previously received from the transmission module A. That is, the frame sequence number 72 matches the last expected frame sequence number 62 in a particular data stream sequence initiated by completing the transmission of a particular data quantity notifying frame 51 from the transmission module A. The reception buffer free capacity information 73 corresponds to the free capacity of the reception buffer in the buffer 24, which has been calculated by the reception buffer free capacity calculating unit 43 of the reception module B.

Also, a type of the data quantity notifying frame 51, the data frame 61, and the ACK frame 71 may be any type of frame used for data communication. For example, frames regulated by the UniPro Specification or the like may be used. In some embodiments, the ACK frame 71 may be an "acknowledgement and flow control" (AFC) frame corresponding to the UniPro Specification or the like.

2. Operation

Figure 8:
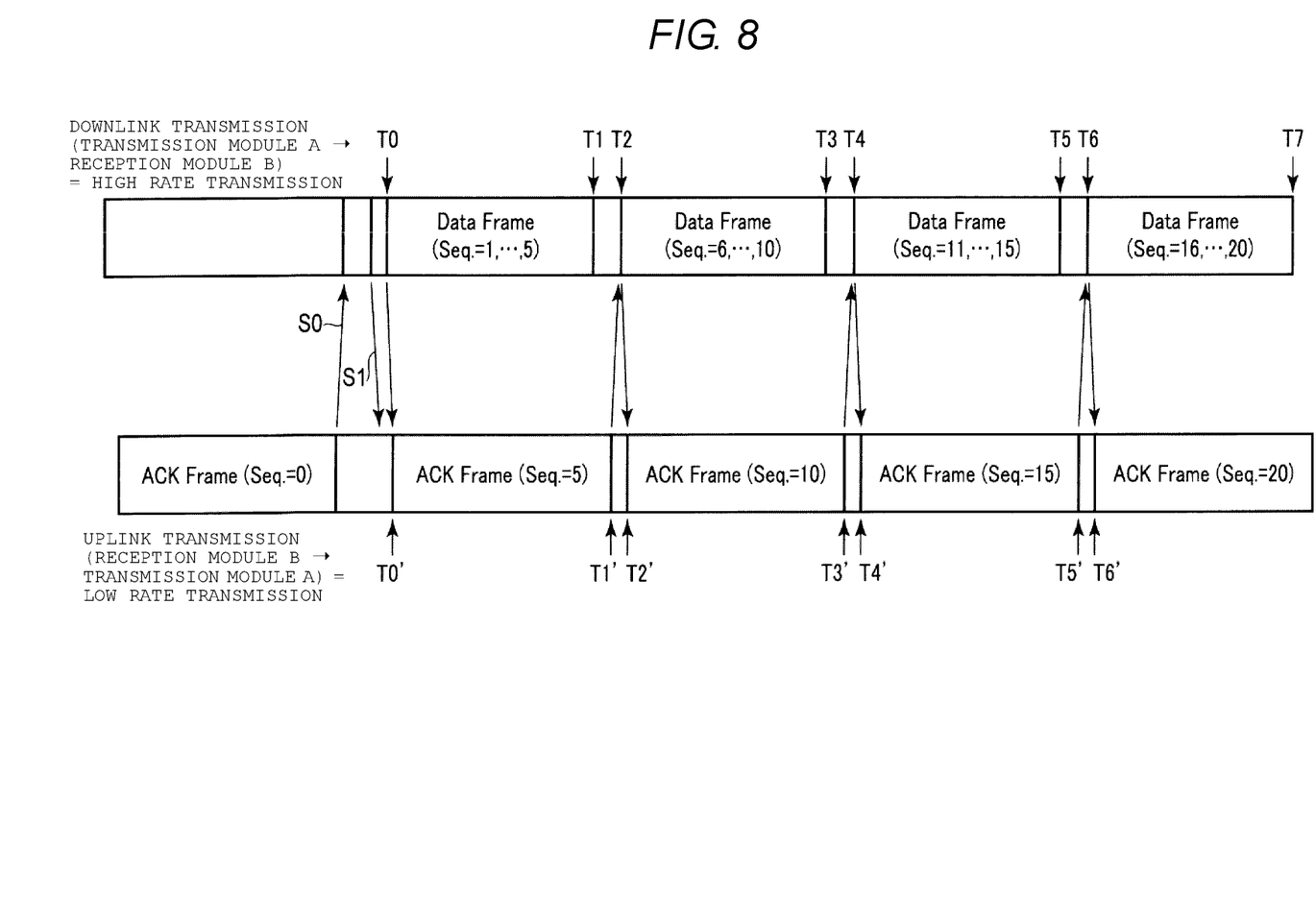
FIG. 8 is a diagram illustrating a data transmission sequence of the uplink transmission path and the downlink transmission path according to an embodiment.

FIG. 8 is a diagram illustrating a data transmission sequence of the uplink transmission path UP and the downlink transmission path DP of the embodiment.

Moreover, each timing of the transmission module A and the reception module B illustrated in FIG. 8 is as follows.

Transmission Module A data frame transmission sequence start=times T0, T2, T4, and T6 data frame transmission sequence completion=times T1, T3, T5, and T7

ACK frame reception start=arbitrary timing (the transmission module A does not use this timing in particular to initiate or otherwise conduct operations)

ACK frame reception completion=times T2, T4, and T6

Reception Module B

ACK frame transmission start=times T0', T2', T4', and T6'

ACK frame transmission completion=times T1', T3', T5' data frame reception start=times T0', T2', T4', and T6' data frame reception completion=arbitrary timing (the reception module B does not use this timing in particular to initiate or otherwise conduct operations)

In FIG. 8, the reception module B completes transmission of the ACK frame 71 (Seq.=0) including an initial value of reception buffer free capacity information and an initial value of the frame sequence number at the transmission rate of the uplink transmission path UP (signal transmission S0 of FIG. 8 corresponding to ACK transmission completion of the first ACK frame 71 illustrated in FIG. 8). For example, the frame sequence number 72 of the ACK frame 71 is set to zero.

The first ACK frame 71 is transmitted from the reception module B according to a predetermined event. For example, the predetermined event may be a case in which the transmission module A and the reception module B are initially connected to each other, a turning on a power of the transmission module A and/or the reception module B, a particular control signal received from the CPU 21 of the reception module B, or a particular signal received from outside of the reception module B, or the like.

At the time of transmitting data, if a ACK frame 71 transmitted from the reception module B has been received, the transmission module A calculates the data quantity information (i.e., total number of data frames and data frame size) based on the reception buffer free capacity information included in the ACK frame 71, and then transmits the data quantity notifying frame 51 through the downlink transmission path DP (signal transmission S1 of FIG. 8). The data quantity notifying frame 51 may instead be transmitted using the uplink transmission path UP in some embodiments.

For example, here the number of the data frames which are to be continuously transmitted in a data frame sequence is five, and the size of each data frame is equal to X byte.

Next, the transmission module A sets the data being transmitted into the data frame (s) 61 having a size and number calculated based on the data quantity information, and then continuously transmits the data (as a sequence of data frames 61) through the downlink transmission path DP (T0 to T1 of FIG. 8).

When the reception module B receives the data quantity notifying frame 51 transmitted through the downlink transmission path DP, a value for the free capacity of the buffer 24 that will be remaining after completion of the transmission of the data stream corresponding to the particular data quantity notifying frame 51 previously received by the reception module can be calculated before the actual finishing of the data transmission from the transmission module A (T1 of FIG. 8). That is, given an initial value of the free buffer capacity, a free buffer capacity that will remain after completion of the on-going data transmission process can be calculated from the data quantity information in the data quantity notifying frame 51 based on the assumption of successful transmission of the corresponding data stream. The reception buffer free capacity information indicates the calculated free capacity of the buffer 24 and a last frame sequence number of the data frame 61 in the expected data frame sequence. The last data frame 61 may still be required to be finally received. The calculated free capacity and the last expected frame sequence number are then set in the ACK frame 71, and this is transmitted through the uplink transmission path UP without waiting for completion of reception of the last data frame 61 (T0' to T1' of FIG. 8) in the data frame sequence (e.g. Seq.=1, . . . , 5).

Also, in the ACK frame 71 (transmission started at a time T0' of FIG. 8), the number of the data frames of the data quantity notifying frame 51 is set to the frame sequence number 72 (for example, the frame sequence number is five) of the ACK frame 71. A start time of transmitting the ACK frame 71 is not actually subject to reception the data frames 61.

Further, in the embodiment, a case in which the data quantity notifying frame 51 is transmitted only at a first data transmission has been described, but the data quantity notifying frame 51 may be transmitted each time a data frame 61 is transmitted.

When the ACK frame 71 has been received through the uplink transmission path UP (T2 of FIG. 8), the transmission module A sets the next data to be transmitted in the data frames 61, and then continuously transmits the data (in a sequence of frames) through the downlink transmission path DP (T2 to T3 of FIG. 8).

Here, when reception of data frames 61 through the downlink transmission path DP is started (T2' of FIG. 8), the reception module B begins to transmit an ACK frame 71 through the uplink transmission path UP (T2' to T3' of FIG. 8).

As described above, for example, if the number of the data frames which are to be continuously transmitted in sequence is five, and a size of each data frame is X byte, the frame sequence number can be set as ten in the frame sequence number 72 for the ACK frame 71 being transmitted.

When reception of the ACK frame 71 (Seq.=10) is completed through the uplink transmission path UP (T4 of FIG. 8), the transmission module A sets next data to be transmitted in the data frames 61, and then may continuously transmits this data (as a sequence of frames) through the downlink transmission path DP (T4 to T5 of FIG. 8).

Once reception of the data frames 61 transmitted from the transmission module A through the downlink transmission path DP is started, the reception module B begins to transmit the next ACK frame 71 through the uplink transmission path UP (T4' to T5' of FIG. 8).

As described above, for example, if the number of the data frames which are continuously transmitted is five, and a size of one data frame is X byte, the frame sequence number can be set as 15 in the frame sequence number 72.

When reception of the ACK frame 71 through the uplink transmission path UP is completed, the transmission module A sets next data to be transmitted in the data frames 61, and continuously transmits the data (as a sequence of frames) through the downlink transmission path DP (T6 to T7 of FIG. 8).

In this manner, data between the transmission module A and the reception module B can be communicated.

3. Effect

Figure 9:
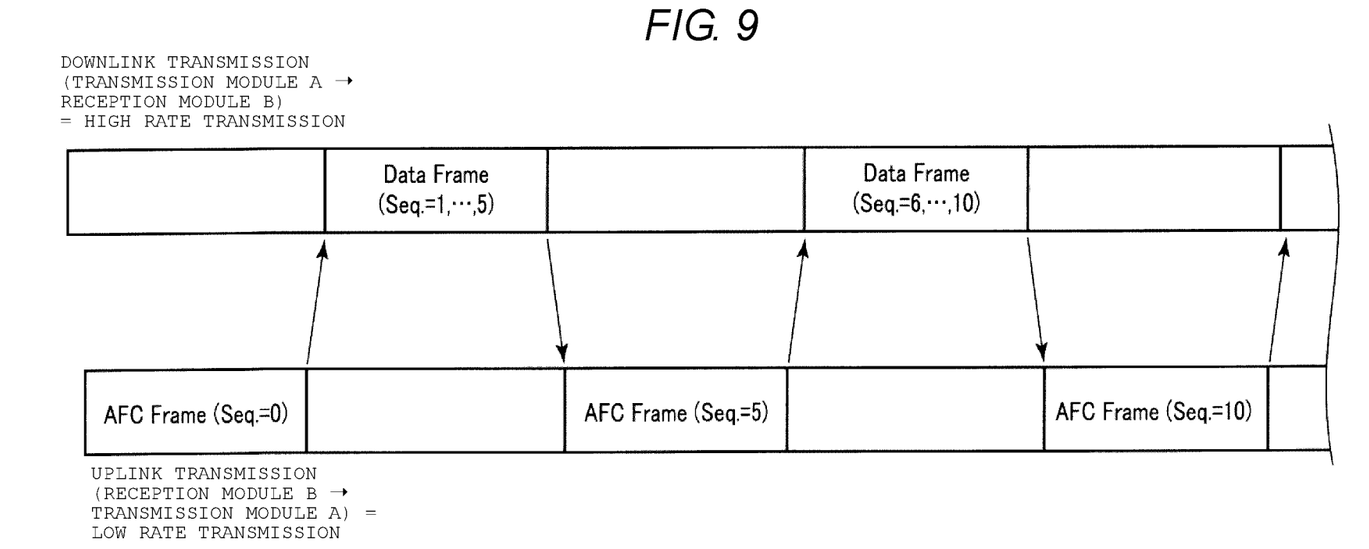
FIG. 9 is a diagram illustrating a data transmission sequence of an uplink transmission path (low rate) and a downlink transmission path (high rate) of a comparison example when communication is performed using a Specification for United Protocol.

FIG. 9 is a diagram illustrating data transmission sequences of an uplink transmission path UP (low rate) and a downlink transmission path DP (high rate) in the related art when transmission is performed using the UniPro Specification or similar protocol.

In FIG. 9, the uplink transmission path UP is set to be a low rate, and the downlink transmission path DP is set to be a high rate. In this case, since the uplink transmission path UP is a low rate, an associated power consumption can be low, and power consumption of the entirety of a system can be reduced. However, since the transmission rate along the uplink transmission path UP is low, the transmission of each AFC frame may require a relatively long time. During the period of transmitting each AFC frame, the transmission module A cannot check a reception buffer capacity of the reception module, and thus the data frame (number and size) for transmitting the next data on the downlink transmission path DP cannot be set and accordingly transmission of this next data cannot be started until completion of the AFC frame reception. Accordingly, there are problems in that a transmission band of the downlink transmission path DP cannot be efficiently utilized (increased dead time between transmission of frame sequences), and video data having a high data rate, or the like cannot be efficiently transmitted.

Figure 10:
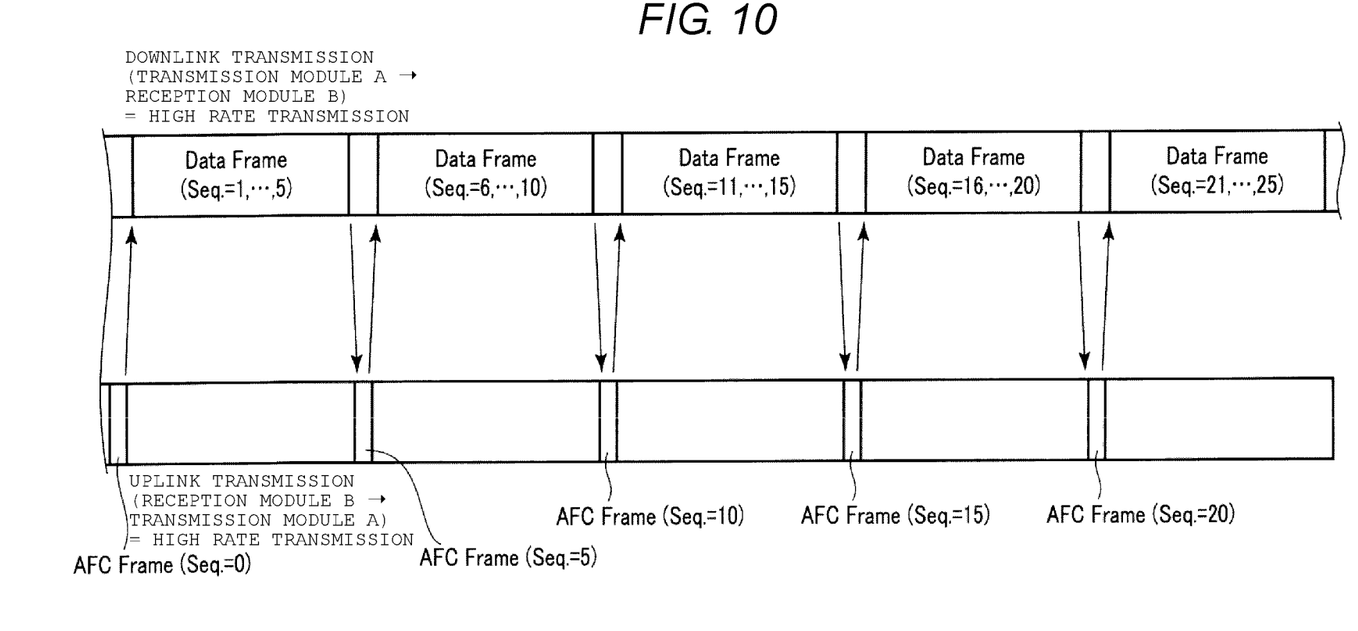
FIG. 10 is a diagram illustrating the data transmission sequence of an uplink transmission path (high rate) and a downlink transmission path (high rate) of a comparison example when communication is performed using the Specification for United Protocol.

FIG. 10 is a diagram illustrating the data transmission sequences of the uplink transmission path UP (high rate) and the downlink transmission path DP (high rate) in the related art when communication is performed using the UniPro Specification or the like.

In this case, since the transmission time of the AFC frame is extremely short, the period in which the downlink transmission path DP cannot be used is also short, and the transmission band of the downlink transmission path DP can be more efficiently utilized. However, to achieve this result there is a problem in that power consumption of the entirety of the system is increased since the uplink transmission path UP is always set in a high rate (which requires higher power consumption).

However, according to the embodiment, the uplink transmission path UP can be set to a low rate, and only the downlink transmission path DP needs to be set in a high rate. Before transmitting the data frame 61, the data quantity notifying frame 51 is transmitted through the downlink transmission path DP, and the ACK frame 71 including the reception buffer free capacity information 73 is transmitted through the uplink transmission path UP without waiting for completion of reception of the data sequence.

Accordingly, since waiting time until the next data frame 51 is transmitted is shortened, the effective utilization of the downlink transmission path DP can be increased. In addition, since the uplink transmission path UP is set at a low rate, the power consumption of the entirety of the system can be reduced. That is, according to the embodiment, both reductions in power consumption and a higher effective data transmission rate along the downlink transmission path DP can be achieved.

Further, since the downlink transmission path DP is set in a high rate, the transmission module A may not need to store data in advance of transmission, and consequently a size of a buffer of the transmission module A can be reduced.

Moreover, in the embodiment, a case in which the information processing apparatus S includes the transmission module A and the reception module B is described; however, the transmission module A can be provided in one information processing apparatus and the reception module B can be provided in another, separate information processing apparatus, and thus the transmission module A and the reception module B may perform data communication between distinct information processing apparatuses. In addition, a single module may include both a function of the transmission module A and the reception module B. Such a module may be referred to as a "transceiver" module in some instances.

The information processing apparatus S comprises, for example, a mobile phone, a portable computer, a wireless handset, a tablet, a digital camera, or the like. In addition, the module A and/or B can be, for example, a video reproducing module, a voice inputting module, an image displaying module, or the like. The uplink and downlink paths may comprise wireless communication paths and/or channels.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An information processing apparatus, comprising:
a transmission module configured to transmit data quantity information and a first sequence of data frames at a first transmission rate; and
a reception module configured to receive the data quantity information and the first sequence of data frames from the transmission module and to transmit a reception buffer free capacity value,
wherein the transmission module includes:
a data quantity transmission unit configured to set the data quantity information for the first sequence of data frames according to the reception buffer free capacity value, and
a data transmission unit configured to transmit the first sequence of data frames at the first transmission rate after the data quantity information for the first sequence of data frames has been transmitted; and
wherein the reception module includes:
a reception buffer configured to receive the first sequence of data frames transmitted from the transmission module, and
a free capacity transmission unit configured to calculate an expected free capacity of the reception buffer corresponding to a free capacity of the reception buffer after the first sequence of data frames has been stored in the reception buffer, the expected free capacity being calculated based on the data quantity information, and to transmit the expected free capacity as the reception buffer free capacity value at a second transmission rate that is lower than the first transmission rate while the first sequence of data frames is being received by the reception buffer.

2. The information processing apparatus according to claim 1, wherein the data quantity information for the first sequence of data frames is determined based on an initialization value for the reception buffer free capacity value transmitted by the reception module.

3. The information processing apparatus according to claim 1, wherein the data quantity information includes a total number of data frames to be included in the first sequence of data frames and a size for each data frame in the first sequence of data frames.

4. The information processing apparatus according to claim 1, wherein
the transmission module comprises a first processor unit connected to a first memory module and a first communication interface; and
the reception module comprises a second processor unit connected to a second memory module and a second communication interface.

5. The information processing apparatus according to claim 1, wherein the reception buffer free capacity value is included in an ACK frame transmitted from the reception module in response to a transmission from the transmission module.

6. The information processing apparatus according to claim 1, wherein the reception buffer free capacity value is included in a frame set according to a Specification for Unified Protocol.

7. The information processing apparatus according to claim 1, wherein at least one of the reception module and the transmission module is disposed within a smart phone.

8. The information processing apparatus according to claim 1, wherein the first sequence of data frames includes video data.

9. The information processing apparatus according to claim 1, wherein transmission of information from the transmission module to the reception module and from the reception module to the transmission module is accomplished by a wireless communication protocol.

10. The information processing apparatus according to claim 1, wherein the transmission module does not include a transmission buffer.

11. The information processing apparatus according to claim 1, wherein the transmission modules includes a transmission buffer.

12. A transmission module, comprising:
a data quantity transmission unit configured to set data quantity information for a first sequence of data frames to be transmitted to a reception module and to have the data quantity information transmitted to the reception module, the data quantity information being set according to a reception buffer free capacity value transmitted by the reception module prior to transmission of the first sequence of data frames to the reception module;
a transmission unit configured to transmit the first sequence of data frames to the reception module after the data quantity information for the first sequence of data frames has been transmitted; and
a reception unit configured to receive a next reception buffer free capacity value transmitted by the reception module while the first sequence of data frames is being transmitted by the transmission unit.

13. The transmission module according to claim 12, further comprising:
a processor unit connected to a memory module and a communication interface.

14. The transmission module according to claim 12, further comprising a transmission buffer configured to store data to be transmitted in the first sequence of data frames.

15. The transmission module according to claim 12, wherein
the data quantity information includes a total number of data frames to be included in the first sequence of data frames and a size for each data frame in the first sequence of data frames, and
the next reception buffer free capacity value is an expected free capacity of a reception buffer in the reception module that is calculated based on the data quantity information.

16. A reception module, comprising:
a reception buffer configured to receive a first sequence of data frames transmitted from a transmission module at a first transmission rate; and
a free capacity transmission unit configured to calculate an expected free capacity of the reception buffer corresponding to a free capacity of the reception buffer after the first sequence of data frames has been stored in the reception buffer, the expected free capacity being calculated based on data quantity information transmitted from the transmission module before the first sequence of data frames, and to transmit the expected free capacity of the reception buffer to the transmission module at a second transmission rate that is lower than the first transmission rate while the first sequence of data frames is being received by the reception buffer.

17. The reception module according to claim 16, wherein the expected free capacity of the reception buffer is included in an ACK frame transmitted from the reception module in response to a transmission of data from the transmission module.

18. The reception module according to claim 16, wherein the data quantity information from the transmission module includes a total number of data frames to be included in the first sequence of data frames and a size for each data frame in the first sequence of data frames.

* * * * *